3,546,939
FLUID FLOW INDICATOR
Howard H. Hilderbrand, 60 Rue Rothschild,
1200 Geneva, Switzerland
Filed Feb. 15, 1968, Ser. No. 705,645
Int. Cl. G01f 1/00; G01p 5/16
U.S. Cl. 73—212                                    1 Claim

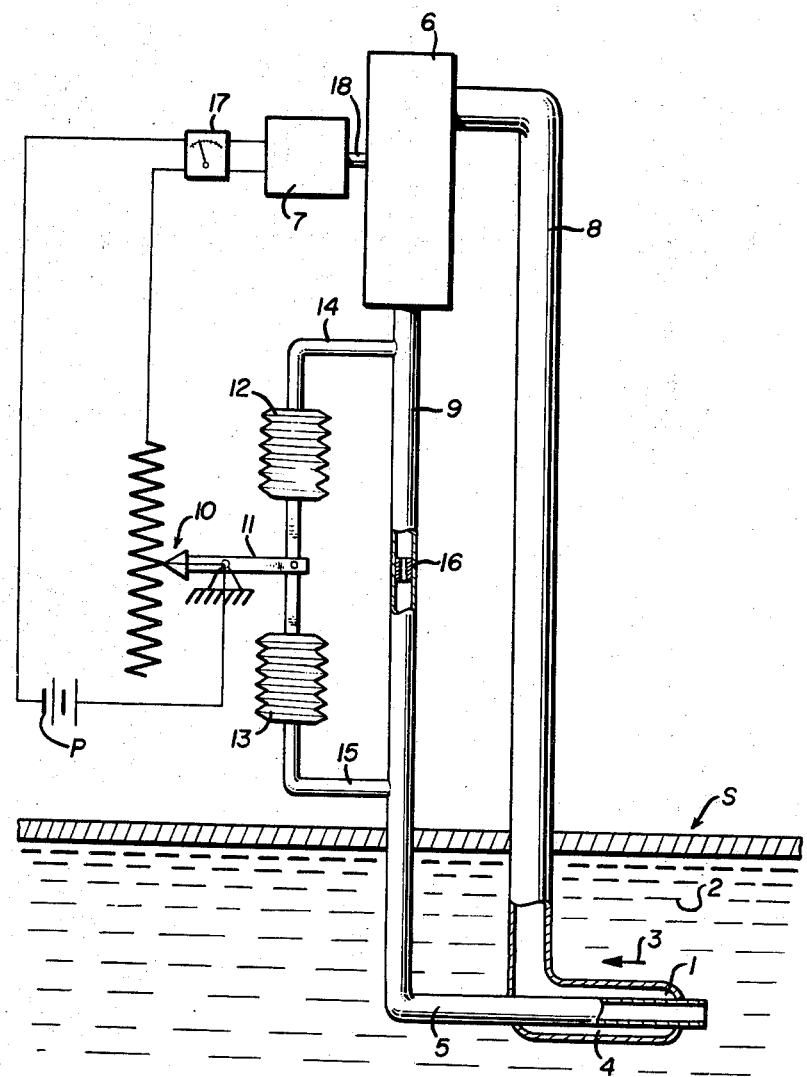

ABSTRACT OF THE DISCLOSURE

A fluid flow indicator for measuring the velocity of fluid flow relative to a structure, such as ship speed or velocity of flow of fluid through a conduit. The energy required to generate a counter-pressure equal to the difference between static and stagnation pressure as measured by a pitot tube is measured and indicated. The counter-pressure is generated by an electrically driven variable speed pump, the current drawn by the pump being indicative of the relative velocity, and by integrating the current a measurement of total displacement or relative movement is obtained.

---

The present invention is especially directed to the provision of an accurate, yet relatively simple and inexpensive device for providing continuous and instantaneous indications of fluid flow velocity. Other objects and features of the invention will become apparent by reference to the following specification and to the drawings.

In the drawings:

The single figure discloses a schematic diagram of one exemplary form of apparatus embodying the present invention.

In the drawings, a pitot tube probe designated generally 1 of conventional construction is mounted upon a structure S to project into a body of fluid 2. The structure S shown in the drawings may represent a ship hull, in which case the apparatus shown will measure ship speed and distance traveled or, alternatively, the structure S may represent a closed pipe or conduit through which the fluid 2 is flowing, in which case the disclosed apparatus will measure the velocity of fluid flow through the conduit and also indicate the total amount of fluid which has passed the apparatus.

The arrow 3 represents the direction of fluid flow relative to the probe portion of the pitot tube and, in the conventional manner, the static pressure within the fluid is measured in chamber 4, while the combined velocity and static head—i.e. stagnation pressure—exists within the tube 5. Chamber 4 is provided with suitably located openings, not shown, in a well known manner. A variable speed pump 6, driven by a variable speed electric motor 7 has its intake connected to a tube 8, connected to chamber 4, while the outlet of pump 6 is connected to tube 9. The outlet pressure of pump 6 is applied as a counter-pressure in opposition to the stagnation pressure. Because the intake pressure of the pump is that of the static pressure within the fluid and the pump outlet pressure counters the stagnation pressure, it is apparent that the pressure produced by the pump will, when its output pressure equals the stagnation pressure, be representative of the velocity head generated by the relative movement between structure S and the fluid 2.

The pump drive motor 7 is energized by the schematically illustrated electric circuit which includes a source of electrical power P and a variable electric resistance or potentiometer 10 by means of which the current supplied to the pump drive motor 7 can be varied. The movable element 11 of the variable resistance is positioned in accordance with the pressure differential which may exist across a restriction 16 located between the open end of tube 5 and the outlet of pump 6. Conduits 14 and 15 conduct the pump ouput pressure and stagnation pressure respectively to bellows assemblies 12 and 13 coupled to the movable element 11.

The purpose of the bellows and variable resistance described above is to regulate the speed of pump drive motor 7 to maintain a condition of equilibrium between the output pressure of the pump and the stagnation pressure detected in tube 5 of the pitot tube assembly.

The stagnation pressure as measured by open tube 5 of the pitot tube assembly is made up of two pressures, one being the static pressure which is that pressure which would exist if there were no relative movement between the structure S and the fluid, the other being the pressure induced tube 5 by virtue of the relative velocity of the fluid to the tube assembly. In the case of a ship, the static head component of the stagnation pressure remains constant and is balanced out by the static head measured in tube 4 and applied to the pump intake. Thus, in order to maintain a zero pressure differential across restriction 16, it is necessary for pump 6 to develop a pressure which is equal to the velocity head component of the stagnation pressure measured by tube 5.

In the present invention, the electrical energy required to drive the pump is directly proportional to the pump output pressure, and thus a measurement of the electrical current flow to pump drive motor 7 is a direct indication of the pump output pressure. An electrical current measuring device 17 connected in the power supply circuit to motor 7 may thus be provided with a dial calibrated to read directly in terms of the velocity of fluid flow relative to the structure S. By mathematically integrating the current over a period of time, the total distance traveled by a ship, for example, can also be obtained from the apparatus.

Instead of measuring the current supplied to motor 7, a more direct velocity indication might be had by applying a tachometer to the pump drive shaft 18 and by measuring the total number of shaft revolutions, a measurement of distance traveled can be obtained.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claim.

I claim:
1. Apparatus for measuring and indicating the relative velocity between a structure and a fluid comprising variable speed pump means having an intake and an outlet, control means operable to vary the speed of said pump means to thereby proportionately vary the outlet pressure of said pump, said control means comprising electric motor means and a variable electrical resistance for controlling the speed of said motor by varying the electrical current supplied thereto, a pitot tube assembly adapted to be mounted in said structure to project into said fluid, said pivot tube assembly having a first tube exposed to the static head in said fluid and a second tube exposed to the stagnation pressure in said fluid, means connecting said first tube to the intake of said pump means whereby the pump is maintained at the static head pressure, means connecting said second tube to the pump outlet whereby the pump outlet pressure is opposed to the stagnation pressure, means responsive to the difference in pressure between said outlet pressure and stagnation pressure for operating said control means to vary the speed of said pump means to equalize said outlet pressure and stagnation pressure and being operable to adjust said variable resistance, comprising a restricted orifice in said second tube, first bellow means responsive to the pressure in said second tube at one side of said orifice, second bellow means responsive to the pressure in said second tube at the opposite side of said orifice, and a movable resistance varying member on said variable electrical resistance coupled to said first and second pressure responsive means to be positioned thereby; and an indicator responsive to the electric current supplied to said motor.

References Cited

UNITED STATES PATENTS

| | | | |
|---|---|---|---|
| 1,451,064 | 4/1923 | Dunajeff | 73—212 |
| 1,541,412 | 6/1925 | Bothezat et al. | 73/212 |

RICHARD C. QUISSER, Primary Examiner

J. K. LUNSFORD, Assistant Examiner